United States Patent
Svanbro et al.

(10) Patent No.: US 6,967,964 B1
(45) Date of Patent: Nov. 22, 2005

(54) CONTEXT IDENTIFICATION USING HEADER COMPRESSION KEY AT LINK LAYER

(75) Inventors: Krister Svanbro, Luleå (SE); Ainkaran Krishnarajah, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 804 days.

(21) Appl. No.: 09/678,340

(22) Filed: Oct. 3, 2000

(51) Int. Cl.[7] ............................ H04J 3/17; H04L 12/56
(52) U.S. Cl. .................. 370/437; 370/477; 370/230.1; 370/235; 709/247
(58) Field of Search ............................. 709/229, 235, 709/310, 389, 386, 392, 411, 465, 466, 471, 709/474, 238, 246, 247; 370/475, 229, 230.1, 370/235, 310, 389, 411, 437, 468; 379/88.1

(56) References Cited

U.S. PATENT DOCUMENTS

| | | | |
|---|---|---|---|
| 5,596,573 A | | 1/1997 | Bertland |
| 5,630,205 A | | 5/1997 | Ekelund |
| 6,032,197 A | * | 2/2000 | Birdwell et al. ............. 709/247 |
| 6,061,366 A | * | 5/2000 | Seki et al. .................... 370/477 |
| 6,366,961 B1 | * | 4/2002 | Subbiah et al. ............. 709/238 |
| 6,487,184 B1 | * | 11/2002 | Pecen et al. ................. 370/329 |
| 6,542,504 B1 | * | 4/2003 | Mahler et al. ............... 370/392 |
| 6,590,905 B1 | * | 7/2003 | Suumaki et al. ............ 370/466 |
| 6,608,841 B1 | * | 8/2003 | Koodli ......................... 370/474 |
| 6,611,866 B1 | * | 8/2003 | Goldman .................... 709/224 |
| 6,665,280 B2 | * | 12/2003 | Forssell et al. .............. 370/329 |
| 6,711,164 B1 | * | 3/2004 | Le et al. ....................... 370/392 |
| 6,721,333 B1 | * | 4/2004 | Milton et al. ................ 370/469 |
| 6,751,209 B1 | * | 6/2004 | Hamiti et al. ............... 370/349 |
| 6,839,339 B1 | * | 1/2005 | Chuah ......................... 370/349 |

FOREIGN PATENT DOCUMENTS

| WO | 00/57284 A | 9/2000 |
|---|---|---|
| WO | 02/01774 A2 | 1/2002 |

OTHER PUBLICATIONS

Technical Specification, "3rd Generation Partnership Project; Technical Specification Group Radio Access Network; Packet Data Convergence Protocol (PDCP) Specification", 3GPP TS 25.323, V3.3.0, Release 1999, Sep. 2000.

(Continued)

*Primary Examiner*—Hassan Kizou
*Assistant Examiner*—Ahmed Elallam
(74) *Attorney, Agent, or Firm*—Nixon & Vanderhye, P.C.

(57) ABSTRACT

A telecommunications network has first and second entities ($20_1$ and $20_2$) which communicate by sending a packet (22) having a compressed header (24'). A header compression key (23) is associated with (e.g., included in) the packet. The header compression key has a first field (23A) which, in a first mode of the invention, is utilized exclusively for distinguishing between different flows of compressed packets (CIDs). In a second mode of the invention, the first field (23A) of the header compression key can be utilized either for distinguishing between the different flows of compressed packets or for distinguishing between different header compression identifiers. Whether the first field of the header compression key is employed exclusively for distinguishing between different flows of compressed packets (the first mode) or can also be employed for distinguishing between different header compression identifiers (second mode) depends on a value in a second field (23B) of the header compression key. In the second mode, a first subset of values for the first field of the header compression key is employed to distinguish between different header compression identifiers, while a second subset of values for the first field is employed to distinguish between the different flows of compressed packets.

108 Claims, 9 Drawing Sheets

OTHER PUBLICATIONS

Burmeister et al; "Robust Header Compression (ROHC)", Internet-Draft, Network Working Group, Bormann (ed.), TZI/Uni Bremen, Sep. 18, 2000.

S. Casner, V. Jacobson, "Compressing IP/UDP/RTP Headers for Low-Speed Serial Links", RFC 2508, Feb. 1999.

Mikael Degermark, Bjorn Nordgren, Stephen Pink, "IP Header Compression", RFC 2507, Feb. 1999.

Postel, J., "User Datagram Protocol", STD 6, RFC 768, Aug. 1980.

Postel, J., "Internet Protocol", STD 5, RFC 791, Sep. 1981.

Postel, J., "Transmission Control Protocol", STD 7, RFC 793, Sep. 1981.

Jacobson, V., "Compressing TCP/IP Headers for Low-Speed Serial Links", RFC 1144, Feb. 1990.

Deering, S. and R. Hinden, "Internet Protocol, Version 6 (lpv6) Specification", RFC 2460, Dec. 1998.

Schulzrinne, H., Casner, S., Frederick, R. and V. Jacobson, "RTP: A Transport Protocol for real-time applications", RFC 1889, Jan. 1996.

Jacobson et al; "Compressing IP/UDP/RTP Headers for Low-Speed Serial Links", IETF Request for Comments 2508, Aug. 1999.

Degermark et al; "Low-Loss TCP/IP Header Compression for Wireless Network", Wireless Networks, ACM, US, vol. 3, No. 5, Oct. 1, 1997, pp. 375-387.

3GPP Technical Spec., "UMTS; Packet Data Convergence Protocol (PCDP) Specification", ETSI TS 125 323 v3.3.0 (Sep. 2000), pp. 1-16.

International Search Report mailed Aug. 7, 2002.

International Preliminary Examination Report mailed Jan. 8, 2003 in corresponding PCT Application No. PCT/SE01/02151.

* cited by examiner

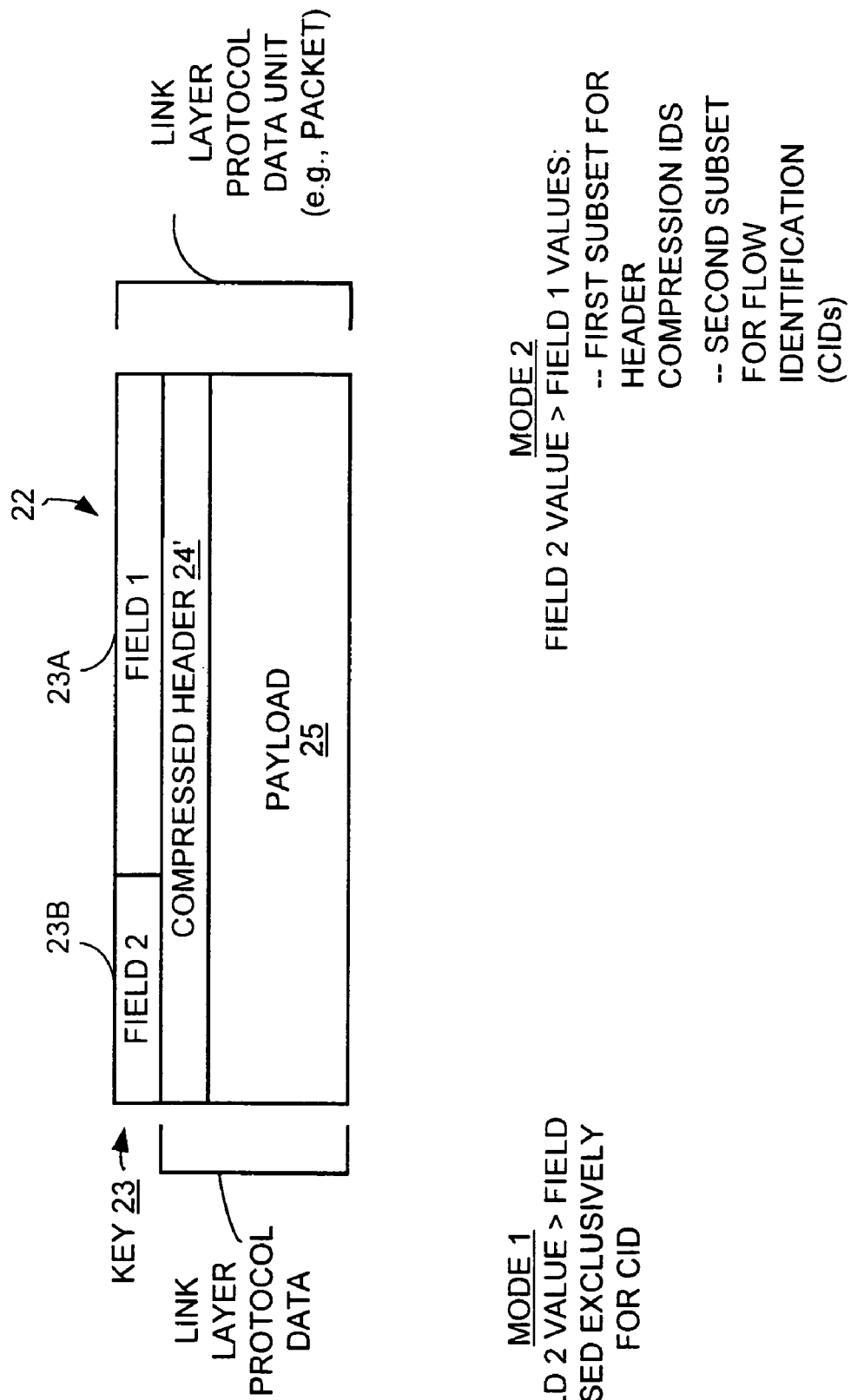

CONTEXT IDENTIFICATION USING HEADER COMPRESSION KEY AT LINK LAYER

BACKGROUND

1. Field of the Invention

The present invention pertains to transmission of packets in telecommunications networks, and particularly to compression of headers for such packets.

2. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UTRAN is a third generation system which in some respects builds upon the radio access technology known as Global System for Mobile communications (GSM) developed in Europe. UTRAN is essentially a wideband code division multiple access (W-CDMA) system. Another example radio access network is GPRS EDGE Radio Access Network (GERAN).

The world of telecommunications is undergoing a shift of paradigm from circuit switched, connection-oriented information transfer towards packet switched, connection-less transfer. Accordingly, the Universal Mobile Telecommunications (UMTS) Terrestrial Radio Access Network (UTRAN) accommodates both circuit switched and packet switched connections. For example, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks)

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface".

For application independence and to decrease coasts for transport and switching, it is attractive to use the packet-switched Internet Protocol (IP) all the way over the air interface to the end user equipment. In other words, it is advantageous not to terminate the Internet Protocols before the air interface. Previously a major reason for not using Internet Protocols over the air interface has been the relatively large overhead imposed by certain "headers" associated with voice packets (e.g., IP/UDP/RTP headers).

Thus, a major problem with transmitting voice using Internet Protocol over a wireless (e.g., air) interface is the large size of headers of the protocols employed when sending speech data over the Internet. For example, an IPv4 packet with speech data has an IP header, a UDP header, and an RTP header, which all together total 20+8+12=40 octets. With IPv6, the IP header is 40 octets for a total of 60 octets. The size of the speech data depends on the codec, and can be from 15 octets to 30 octets. These relatively large numbers would militate in favor of terminating the IP protocols prior to the air interface, since the IP/UDP/RTP headers require a higher bit rate and cause inefficient use of the expensive radio spectrum From the foregoing it is appreciated that it is a fundamental challenge to reduce the IP header-related overhead over the relatively error prone and narrow band cellular channels, while maintaining the transparency of all header fields. This challenge has been addressed, with differing degrees of success, using techniques of header compression.

While all header information in a voice packet is needed, there is a high degree of redundancy between header fields in the headers of consecutive packets belonging to the same packet stream, e.g., the same packet flow. Capitalizing upon this observation, header compression algorithms typically attempt to maintain a "context". The context, maintained at both ends of the channel over which the header compression is performed, is essentially the uncompressed version of the last header transmitted. Compressed headers carry, among other things, changes to the context. Header compression schemes typically have mechanisms for installing context, for detecting when the context is out of date, and for repairing the downstream context when it is out of date.

When having multiple compressed header flows over the same link, there must be some way to determine that a specific compressed header belongs to a specific compressed flow of packets (e.g., to a particular packet stream). This is important since the compressor and decompressor use a state (i.e., the aforementioned context) to determine how it will compress/decompress the header. In a typical scenario of packet transmission, the compressor receives an uncompressed header belonging to a specific packet flow, and uses the correct context for that packet flow to compress that header. The compressed header is transmitted using some kind of mechanism to identify to which flow this specific header belongs. At the other end of the link, the decompressor receives the compressed header, and uses the mechanism to ascertain to which flow or context the header belongs. The decompressor can then use the identified context to decompress the header.

An early header compression scheme, herein known as CTCP, was proposed by Jacobson, V., "Compressing TCP/IP Headers for Low-Speed SerialLinks", RFC 1144, February 1990. CTCP compresses the 40 octet IP+TCP header to two-four octets. The CTCP compressor detects transport-level retransmissions and sends a header that updates the context completely when they occurs.

A general IP header compression scheme known as IP Header Compression (IPHC) can compress arbitrary IP, TCP, and UDP headers. When compressing non-TCP headers, IPHC does not use delta encoding and is robust. When compressing TCP, the repair mechanism of CTCP is augmented with a link-level nacking scheme which speeds up the repair. IPHC does not compress RTP headers.

A header compression scheme known as CRTP has been proposed for real-time IP services. See, e.g., S. Casner, V. Jacobson, "Compressing IP/UDP/RTP Headers for Low-Speed Serial Links", RFC 2508, February 1999. CRTP can compress 40 octet IPv4/UDP/RTP headers to a minimum of two octets. For context repair, CRTP relies on existence of an upstream link over which a decompressor sends requests for updating headers. While the context is out of date, all packets received cannot be decompressed.

A header compression scheme known as Robust Header Compression (ROHC) is suitable for cellular usage. See, e.g., C. Borman et al, "Robust Header Compression (ROHC)", draft-ietf-rohc-rtp-02.txt (work in progress), September 2000. In ROHC, a checksum covering the original (uncompressed) header is included in the compressed header to introduce a reliable way to detect when the context is out of date, and when an attempt to repair the context locally has succeeded. ROHC introduces different compression profiles to handle different kinds of RTP-streams and channel conditions to achieve as high performance as possible. In addition, ROHC includes in its compressed header codes which provide the decompressor with hints about how header fields have changed, e.g., due to loss over the cellular link. In ROHC, the packet type identification is incorporated in the header compression scheme, and thus this functionality is not needed from the link layer. In this regard, the ROHC may have context identifiers (CIDs) of size 0, 1, or 2 bytes.

An undertaking known as the Third Generation Partnership Project (3GPP) has endeavored to evolve further the UTRAN and GSM-based radio access network technologies, including header compression for UDP/IP and TCP/IP headers. One aspect of the 3GPP system which is of importance for header compression schemes is the concept of logically separated channels or radio bearers (instead of completely shared channels [such as, for example, the Internet]). It has been proposed that context identifiers (CIDs) be used to identify which context should be used to decompress a compressed header. See, S. Casner, V. Jacobson, "Compressing IP/UDP/RTP Headers for Low-Speed Serial Links", RFC 2508, February 1999; and Mikael Degermark, Bjorn Nordgren, Stephen Pink, "IP Header Compression", RFC 2507, February 1999. In a 3GPP cellular system, there has already been a de-multiplexing of the traffic onto different radio bearers. This separation reduces the need for context identification. Therefore, the number of contexts per radio bearer are relatively small.

The Third Generation Partnership Project (3GPP) Specification 3G TS 25.323 V3.3.0 (2000-09) describes a link layer protocol known as Packet Data Convergence Protocol (PDCP). Some of the main functions of the Packet Data Convergence Protocol (PDCP) are: (1) transfer of packet data protocol user data using services provided by the Radio Link Control (RLC) protocol; and (2) header compression (e.g., compression of redundant control information). The Packet Data Convergence Protocol (PDCP) provides its services by way of PDCP entities at the user equipment unit (UE) or at the relay at the radio network controller (RNC).

In its current form (e.g., TS 25.323. v3.3.0), in Packet Data Convergence Protocol (PDCP) every radio bearer is connected to one PDCP entity, and one PDCP entity is connected to one RLC entity. Every PDCP entity uses either zero, one, or several header compression algorithm types with certain parameters, and several PDCP entities may use the same algorithm type.

In Packet Data Convergence Protocol (PDCP), the header compression method is specific for each network layer protocol type. The header compression algorithms and their parameters are negotiated by a Radio Resource Control (RRC) for each PDCP entity and indicated to PDCP through a PDCP Control Service Access Point (PDCP-C-SAP). Compressor and decompressor initiated signalling between peer PDCP entities, during operation, is carried out in the user plane.

As set forth in the 3GPP Specification 3G TS 25.323 V3.3.0 (2000-09), the Packet Data Convergence Protocol (PDCP) features a protocol data unit (PDU) which can be one of three types. The first type is a PDCP-No-Header PDU; the second type is a PDCP Data PDU; the third type is a PDCP SeqNum PDU. Both the PDCP Data PDU and the PDCP SeqNum PDU include a three bit PDU type field and a five bit PID field. A value in the three bit PDU type field indicates whether the PDU is a PDCP Data PDU or a PDCP SeqNum PDU (See, e.g., 3GPP Specification 3G TS 25.323 V3.3.0 (2000-09), Section 8.3.1). The five bit PID field indicates the used header compression and packet type.

A PDCP Data PDU with its three bit PDU type field and five bit PID field as set forth in 3GPP Specification 3G TS 25.323 V3.3.0 (2000-09). Table 1 below is taken from 3GPP Specification 3G TS 25.323 V3.3.0 (2000-09) as showing an example of PID value allocation for the five bit PID field for the PDCP Data PDU. (See, e.g., 3GPP Specification 3G TS 25.323 V3.3.0 (2000-09), Section 8.2.2 and Section 8.3.2).

TABLE 1

| PID VALUE | Optimization Method | Packet Type |
| --- | --- | --- |
| 0 | No header compression | — |
| 1 | RFC2507 | Full header |
| 2 | RFC2507 | Compressed TCP |
| 3 | RFC2507 | Compressed TCP nondelta |
| 4 | RFC2507 | Compressed non TCP |
| 5 | RFC2507 | Context State |
| 6 | Method A | Uncompressed TCP/IP |
| 7 | Method A | Compressed TCP/IP |
| 8 | Method B | Uncompressed IP/UDP/RTP |
| 9 | Method B | Compressed IP/UDP/RTP |
| 10 . . . 31 | Unassigned Value | — |

As described in 3GPP Specification 3G TS 25.323 V3.3.0 (2000-09), Section 5.1.1, for a certain algorithm in a PCDP entity the assignment of PID values starts from (n+1) where n is the number of PID values already assigned to other algorithms. The assignment is done in the order the algorithms are negotiated by the Radio Resource Control. In the example of Table 1, RFC2507 is the first algorithm assigned, Method A was the second algorithm, and Method B was the third algorithm in the PDCP information element exchanged between peer Radio Resource Control entities.

The mechanism mentioned above for differentiating between contexts can be either explicit in the header compression scheme by usage of the context identifiers (CIDs), or implicitly by using a link layer mechanism to differentiate the compressed flows. Usage of explicit CIDs requires extra bits in the compressed headers as in the ROHC technique at the header compression level. On the other hand, usage of implicit context identification at the link layer level such as in Packet Data Convergence Protocol (PDCP) imposes an additional cost at the link layer level.

In a scheme in which there is no PDCP header (See, e.g., 3GPP Specification 3G TS 25.323 V3.3.0 (2000-09), Section 8.2.1), there is no possibility to offer link layer identification of header compression packet types by PDCP. This means that IP header compression (RFC2507) cannot be used when PDCP is configured with the no header option. However, the ROHC algorithm can be used in this mode as the header compressed packet type identification is accomplished with ROHC.

Whereas ROHC can support RTP/UDP/IP compression, the RFC2507 compression algorithm supports (among other things) TCP/IP compression. Likely it will be advantageous in the future in certain applications to mix both RTP/UDP/IP and TCP/IP traffic, as in streaming services (e.g., for example, real-time multimedia applications).

What is needed, therefore, and an object of the present invention, is a technique which facilitates a mixing of packets having headers compressed by one or more compression algorithms which require packet type identification at the link level with other packets having headers compressed by one or more compression algorithms which do not require packet type identification at the link level.

BRIEF SUMMARY OF THE INVENTION

A telecommunications network has first and second entities which communicate by sending a packet having a compressed header. A header compression key is associated with (e.g., included in) the packet. The header compression key has a first field which, in a first mode of the invention, is utilized exclusively for distinguishing between different flows of compressed packets. In a second mode of the invention, the first field of the header compression key can be utilized either for distinguishing between the different flows of compressed packets or for distinguishing between different header compression identifiers.

Whether the first field of the header compression key is employed exclusively for distinguishing between different flows of compressed packets (the first mode) or employed for distinguishing between different header compression identifiers (second mode) depends on the value in the second field of the header compression key.

In the second mode, a first subset of values for the first field of the header compression key is employed to distinguish between different header compression identifiers, while a second subset of values for the first field is employed to distinguish between the different flows of compressed packets. The values of the second subset preferably succeed the values of the first subset.

In one illustrated embodiment, the header compression key is a header of a protocol data unit of a link layer protocol, and in particular a header for a protocol data unit for a protocol known as Packet Data Convergence Protocol (PDCP). In this embodiment, the first field is a PID type field of the header of the protocol data unit and the second field is a PDU type field of the header of the protocol data unit. The distinction between different flows of compressed packets is performed by context identifiers for a compression/decompression algorithm, and preferably a compression/decompression algorithm such as the Robust Header Compression (ROHC) algorithm which does not require packet type identification at a link layer level. For the second mode, the header compression identifiers in this embodiment denote a header compression method and a packet type.

An example implementation of the invention is a cellular telecommunications network in which the first entity is a header compression/decompression entity located at a radio network controller node (RNC) and the second entity is a header compression/decompression entity in a user equipment unit (UE), e.g., cellular telephone or other unit with mobile termination.

The present invention advantageously permits a compression level-header (e.g., ROHC header) carried in a data portion (e.g., non-header portion) of the protocol data unit to omit its context identifier, since the context identifier is instead carried in the header of the link layer protocol data unit. Thus, the present invention can reduce overhead involved with header transmission. Further, the present invention advantageously facilitates mixing of compression/decompression techniques regardless of whether the techniques require packet type identification at the link level, e.g., a mixing of the Robust Header Compression (ROHC) algorithm and IP header compression algorithms such as RFC2507. Such mixing enables support of combinations of complex applications, such as a mix of RTP/UDP/IP traffic (which utilizes ROHC) and TCP/IP traffic (which utilizes RFC2507 compression).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2 is a diagrammatic view showing an example format of a link layer protocol data unit with a header compression key.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail.

Figure 1:
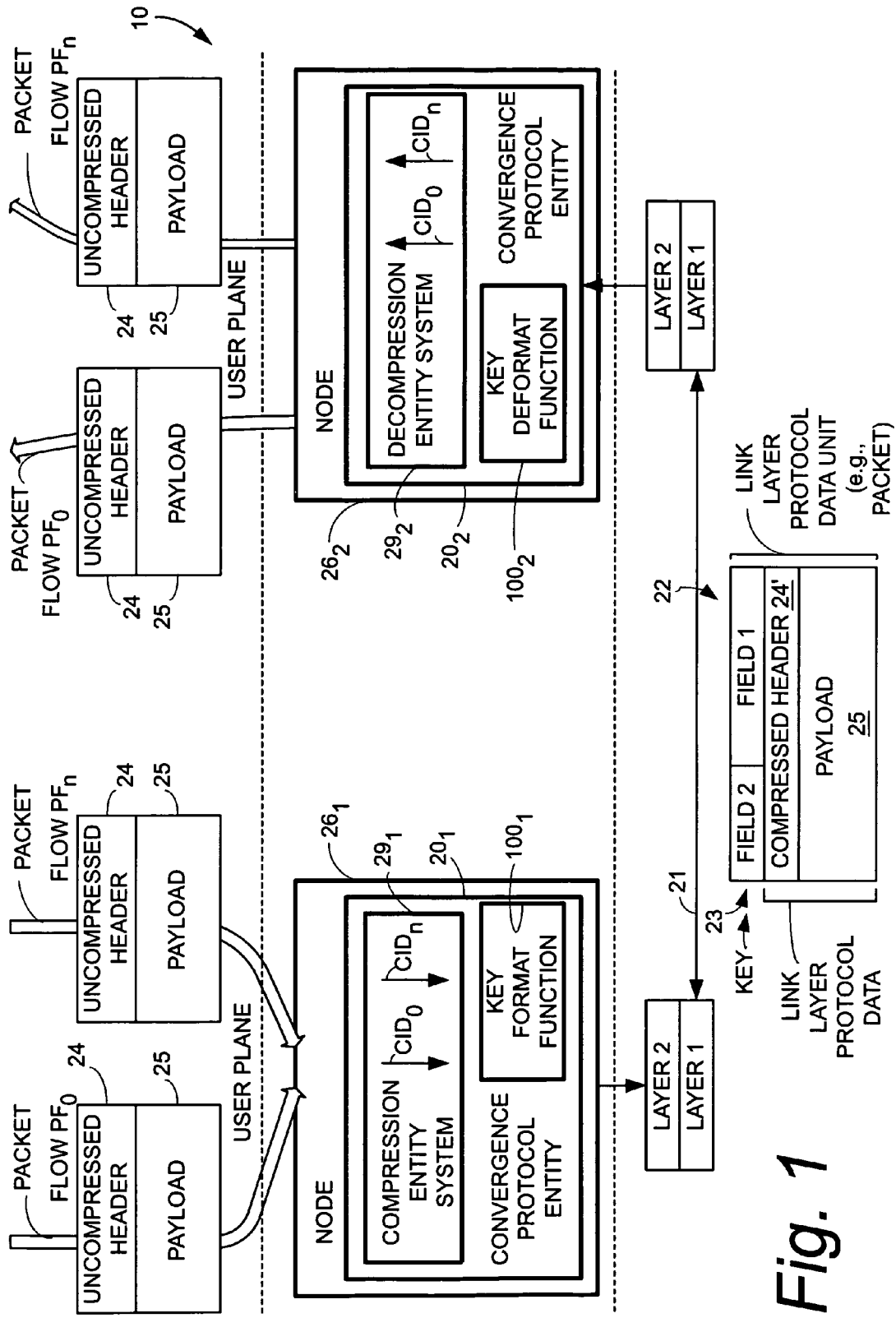
FIG. 1 is a diagrammatic function block view of a telecommunications network which implements a header compression scheme with a header compression key according to an embodiment of the present invention.

FIG. 1 shows, as an example non-limiting embodiment of the present invention, a telecommunications network 10 which has first and second convergence protocol entities $20_1$, $20_2$ which communicate with one another over a link 21 by sending a packet 22. As explained hereinafter, in accordance with the present invention packet 22 features a header compression key 23, as well as data portion which includes both a compressed header 24' and a payload 25.

In the example embodiment of FIG. 1, the first and second convergence protocol entities $20_1$, $20_2$ are situated at respective nodes $26_1$, $26_2$ of the telecommunications network. In the particular scenario illustrated in FIG. 1, node $26_1$ receives plural streams of packets $PF_x$ from a user plane, e.g., packet flows $PF_0$–$PF_n$. Each packet of the packet flows $PF_x$ has both an uncompressed header 24 and a payload 25. When a packet is received at node $26_1$, various activities are performed. Germane to the present invention is a header compression operation which is performed by a compression entity system $29_1$ included in convergence protocol entity $20_1$ of node $26_1$. In connection with the header compression, compression entity system $29_1$ generates a context identifier (CID) for each packet. FIG. 1 shows, for example, a context identifier $CID_0$ which is generated for a packet in packet flow $PF_0$ and a context identifier $CID_n$ which is generated for a packet in packet flow $PF_n$. The mapping from $PF_x$ to $CID_Y$ is arbitrary (with x and y in the range of from 0 to n), typically with x=y.

For each packet incoming to node $26_1$ the convergence protocol entity $20_1$ generates a link layer protocol data unit which is also illustrated as packet 22 in FIG. 1. In the illustrated embodiment, the link layer protocol data unit 22 is transmitted over a link 21, which is layer 1 or the lowest of two illustrated layers, from convergence protocol entity $20_1$ of node $26_2$ to the convergence protocol entity $20_2$ of node $26_2$. The link layer protocol data unit (packet 22) may have a header, with some or all of such header also being referred to herein as the header compression key 23. The convergence protocol entity $20_1$ includes a key formatter unit $100_1$ which generates or formats the header compression key 23. As several packet flows come into the key formatter unit $100_1$ e.g., IN/UDP/RTP and TCP/IP flows), the key formatter unit $100_1$ constructs an appropriate header compression key 23 which is to be added to payload 25.

Upon receipt, the convergence protocol entity $20_2$ of node $26_2$ performs various operations upon the packets received over link 21, including calling upon its key deformatter $100_2$ to deformat header compression key 23 and its decompression system $29_2$ to decompresses the header 24'. After decompression, node $26_2$ can route a packet to the appropriate packet flow $FP_x$ emanating from node $26_2$ (e.g., toward the user plane).

As mentioned above, packet or link layer protocol data unit 22 includes the key 23 in the link layer protocol data portion of packet 22. In one embodiment, key 23 is essentially a header for the link layer protocol data unit 22, and is generated by the key format function $100_1$ which is included in convergence protocol entity $20_1$. The link protocol data portion of packet 22 includes the compressed header 24' (resulting from the compression activity of compression entity system $29_1$) and the payload 25 of the user plane packet.

FIG. 2 shows, somewhat enlarged, the link layer protocol data unit 22 or packet which travels over link 21 from the convergence protocol entity $20_1$ of node $26_1$ to the convergence protocol entity $20_2$ of node $26_2$. In the illustrated embodiment of FIG. 2, the header compression key 23 is the first octet of link layer protocol data unit 22 and comprises two fields, particularly a first field 23A and second field 23B. It so happens in the header compression key 23 that the lowest order five bits constitute first field 23A and the highest order three bits constitute second field 23B. It should be understood that the placement and size of these fields can vary in other embodiments.

The present invention can be operated in various modes, two of which are depicted in FIG. 2 as the first mode and the second mode. A value in the second field 23B indicates which mode of the invention is being utilized for a given packet. For example, a 010 bit pattern in second field 23B can indicate that the first mode of the invention is applicable, while a 000 bit pattern in second field 23B can indicate that the second mode of the invention is applicable. Other conventions of bit patterns for the second field 23B can, of course, be utilized. Additionally, 23B could indicate the specific header compression algorithm to be used with context identification.

In the first mode of the invention, the value in the first field 23A is utilized exclusively for distinguishing between different flows of compressed packets. In other words, when the second field 23B of the header compression key 23 indicates that the first mode is in effect, it is realized that the first field 23A contains a context identifier (CID). In this first mode of the invention, all numbers in first field 23A are context identifier (CIDs), with the result that the context identifier (CID) numbering can begin at zero and increase by one for each number packet flow.

In the second mode of the invention, the first field 23A of the header compression key can be utilized either for distinguishing between different header compression identifiers or for distinguishing between the different flows of compressed packets. In particular, in the second mode, a first subset of values for the first field 23A of the header compression key is employed to distinguish between different header compression identifiers, while a second subset of values for the first field 23A is employed to distinguish between the different flows of compressed packets. The values of the second subset preferably succeed the values of the first subset.

As an example for the second mode, a first k number of values in first field 23A of header compression key 23 may be used to differentiate between k number of different header compression identifiers [e.g., header compression identifiers 0 through (k−1)]. The remaining values of first field 23A can then be used to distinguish between the different flows of compressed packets (CIDs) for one or more header compression algorithms. Thus, when the first field 23A has five bits, the K+1$^{th}$ through 32$^{nd}$ values of the first field 23A can refer to a compression context identifier.

Form the foregoing it will be appreciated that, if the value in the first field 23A of header compression key 23 is one of the first k number of possible values, it is recognized as a header compression identifier. On the other hand, if the value in the first field 23A of header compression key 23 is outside (e.g., greater) than the first k number of possible values, it is recognized as a flow identifier (e.g., CID).

FIG. 1 shows that the invention with its header compression key 23 can be implemented in a generic telecommunications network involving two nodes, e.g., nodes $26_1$ and $26_2$. Another example, non-limiting implementation of the invention is a cellular telecommunications network in which the first entity is a header compression/decompression entity located at a radio network controller node (RNC) and the second entity is a header compression/decompression entity in a user equipment unit (UE), e.g., cellular telephone or other unit with mobile termination. One example, non-limiting configuration for such an implementation is the universal mobile telecommunications (UMTS) 3-10 shown in FIG. 3. Another example if GERAN, or any other radio access network which uses the PDCPlayer in its air interface protocol stack.

Figure 3:
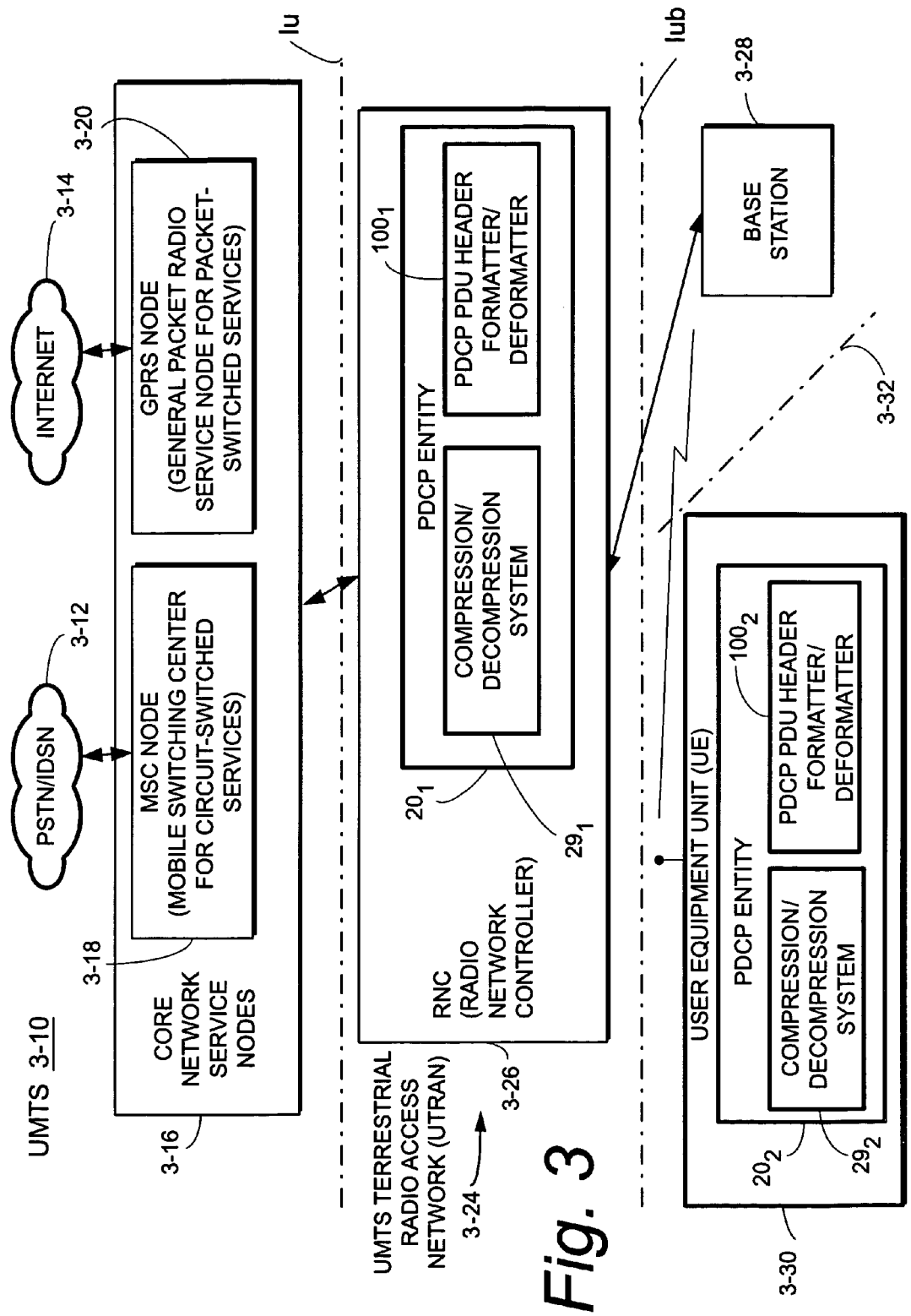
FIG. 3 is diagrammatic view of example mobile communications system in which the header compression key of the present invention may be advantageously employed.

In the universal mobile telecommunications (UMTS) 3-10 of FIG. 3, a representative, connection-oriented, external core network, shown as a cloud 3-12 may be for example the Public Switched Telephone Network (PSTN) and/or the Integrated Services Digital Network (ISDN). A representative, connectionless-oriented external core network shown as a cloud 3-14, may be for example the Internet. Both core networks are coupled to their corresponding service nodes 3-16. The PSTN/ISDN connection-oriented network 3-12 is connected to a connection-oriented service node shown as a Mobile Switching Center (MSC) node 3-18 that provides circuit-switched services. The Internet connectionless-oriented network 3-14 is connected to General Packet Radio Service (GPRS) nodes 3-20 tailored to provide packet-switched type services, which are sometimes referred to as the serving GPRS service nodes (SGSN).

Each of the core network service nodes 3-18 and 3-20 connects to a UMTS Terrestrial Radio Access Network (UTRAN) 3-24 over a radio access network (RAN) interface referred to as the Iu interface. UTRAN 3-24 includes one or more radio network controllers (RNCs) 3-26. For sake of simplicity, the UTRAN 3-24 of FIG. 3 is shown with only one RNC node 3-26. Each RNC 3-26 is typically connected to a plurality of base stations (BS) 3-28. For example, and again for sake of simplicity, only one base station node 3-28 is shown connected to RNC 3-26. It will be appreciated that a different number of base stations can be served by each RNC, and that RNCs need not serve the same number of base stations.

A user equipment unit (UE), such as user equipment unit (UE) 3-30 shown in FIG. 3, communicates with one or more base stations (BS) 3-28 over a radio or air interface 3-32. Each of the radio interface 3-32, the Iu interface and the Iub interface are shown by dash-dotted lines in FIG. 3.

Preferably, radio access is based upon wideband, Code Division Multiple Access (WCDMA) with individual radio channels allocated using CDMA spreading codes. Of course, other access methods may be employed, for example GERAN. WCDMA provides wide bandwidth for multimedia services and other high transmission rate demands as well as robust features like diversity handoff and RAKE receivers to ensure high quality. Each user mobile station or equipment unit (UE) 3-30 is assigned its own scrambling code in order for a base station 3-28 to identify transmissions from that particular user equipment unit (UE) as well as for the user equipment unit (UE) to identify transmissions from the base station intended for that user equipment unit (UE) from all of the other transmissions and noise present in the same area.

Figure 4:
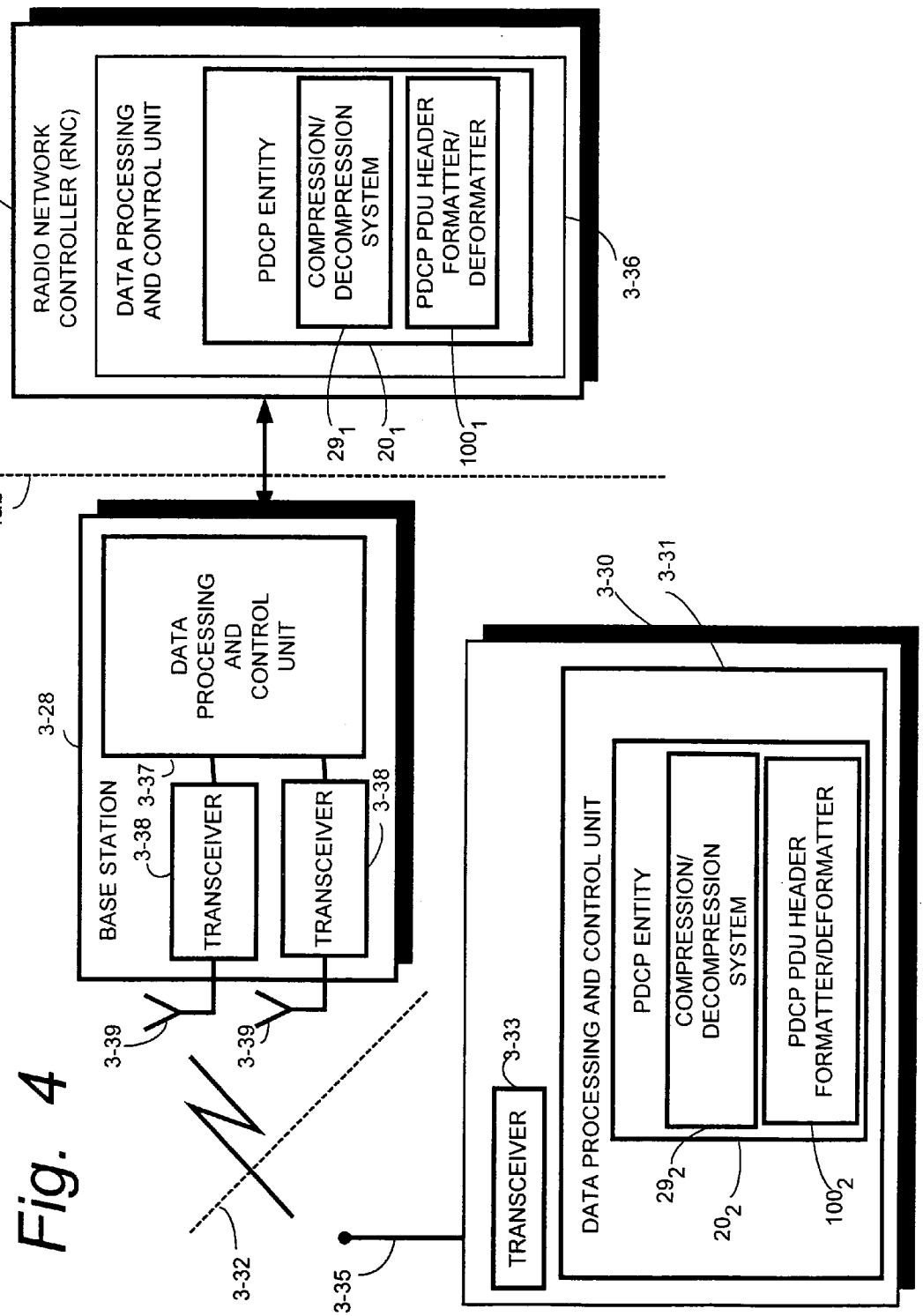
FIG. 4 is a simplified function block diagram of a portion of the system of FIG. 3, including a user equipment unit (UE) station; a radio network controller; and a base station.

FIG. 4 shows selected general aspects of user equipment unit (UE) 3-30 and illustrative nodes such as radio network controller 3-26 and base station 3-28. The user equipment unit (UE) 3-30 shown in FIG. 4 includes a data processing and control unit 3-31 for controlling various operations required by the user equipment unit (UE). The UE's data processing and control unit 3-31 provides control signals as well as data to a radio transceiver 3-33 connected to an antenna 3-35.

The example radio network controller 3-26 and base station 3-28 as shown in FIG. 4 are radio network nodes that each include a corresponding data processing and control unit 3-36 and 3-37, respectively, for performing numerous radio and data processing operations required to conduct communications between the RNC 3-26 and the user equipment units (UEs) 3-30. Part of the equipment controlled by the base station data processing and control unit 3-37 includes plural radio transceivers 3-38 connected to one or more antennas 3-39.

In the Universal Mobile Telecommunications System (UMTS) 3-10 of FIG. 3 and FIG. 4, the convergence protocol entity $20_1$ and the convergence protocol entity $20_2$ take the form of Packet Data Convergence Protocol (PDCP) entities $10_1$ and $20_2$, respectively. The PDCP entities $20_1$ and $20_2$ are respectively situated at radio network controller (RNC) node 3-26 and user equipment unit (UE) 3-30. Thus, in this sense, the user equipment unit (UE) 3-30 is viewed as a node at least with respect to the link layer. As in the embodiment of FIG. 1, the PDCP entities $20_1$ and $20_2$ have compression systems $29_1$, and $29_2$, respectively. Also, in analogy to the key formatter/deformatter functions 100 of FIG. 1, the the PDCP entities $20_1$ and $20_2$ have the PDCP PDU header formatter/deformatters $100_1$, $100_2$, respectively.

At the moment in time depicted in FIG. 3, only packet flow in the direction from the radio network control (RNC) node 3-26 to the user equipment unit (UE) 3-30 is shown. At this moment, the PDCP entity $20_1$ is performing header compression (with its PDCP DPU header formatter/deformatter 100 inserting the header compression key 23 of the present invention), while PDCP entity $20_2$ is performing decompression, etc. It should be understood, however, that packet flow is typically bidirectional, and that packets also travel from user equipment unit (UE) 3-30 to radio network control (RNC) node 3-26, for which PDCP entity $20_2$ performs header compression (with PDCP DPU header formatter/deformatter $100_2$ inserting the header compression key 23 of the present invention), while PDCP entity $20_1$ is performs the decompression.

In the example embodiment of FIG. 3 and FIG. 4, the header compression key is a header of a protocol data unit of a link layer protocol, and in particular a header for a protocol data unit for a protocol known as Packet Data Convergence Protocol (PDCP). As mentioned previously, Packet Data Convergence Protocol (PDCP) is described, e.g., in Third Generation Partnership Project (3GPP) Specification 3G TS 25.323 V3.3.0 (2000-09). In the embodiment of FIG. 3 and FIG. 4, the first field 23A of header compression key 23 is a PID type field of the header of the protocol data unit (PDU) and the second field 23B is a PDU type field of the header of the protocol data unit (PDU).

Figure 5:
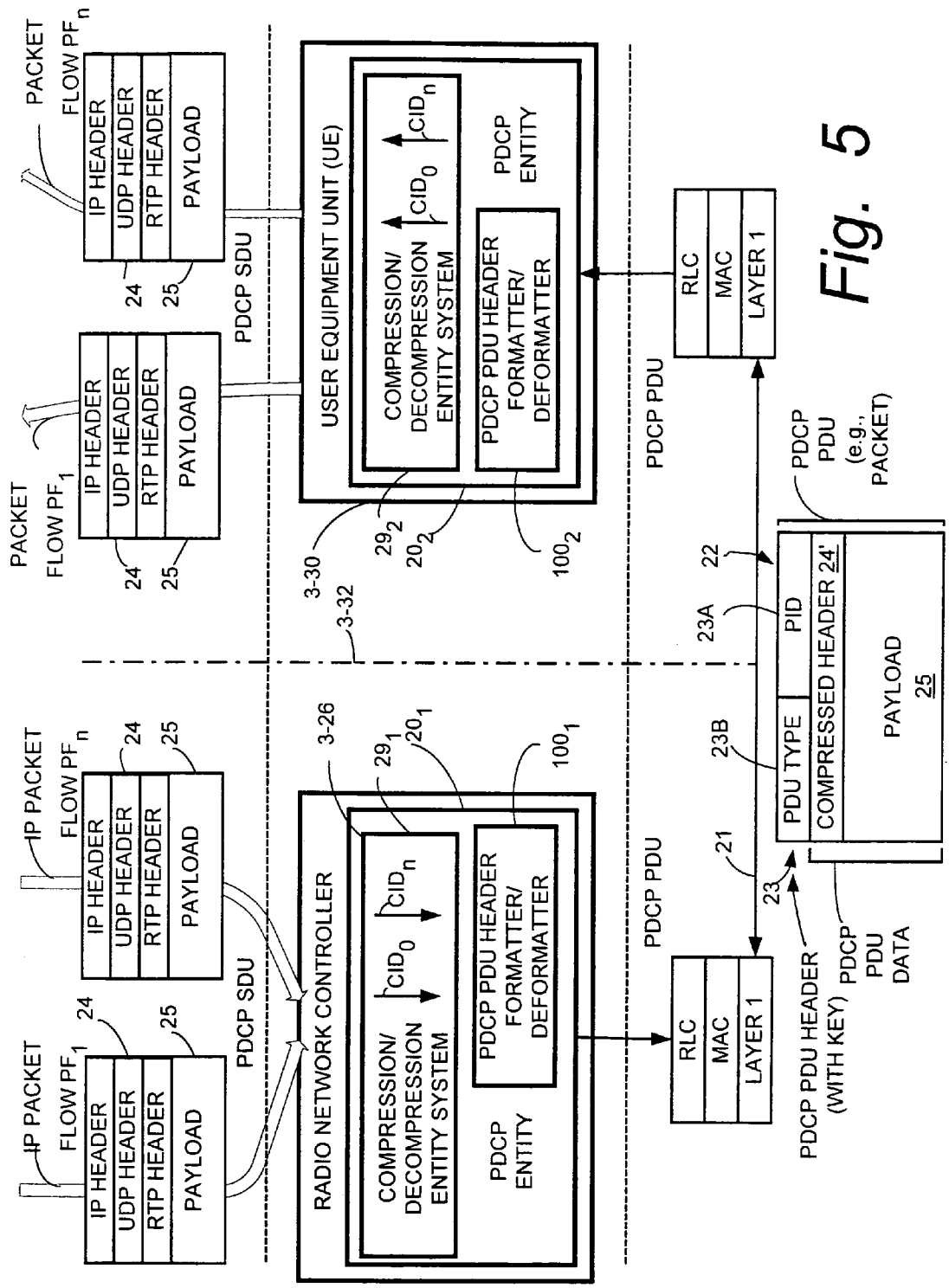
FIG. 5 is a diagrammatic function block view of the telecommunications network of FIG. 3, showing in more detail an implementation of the header compression key.

FIG. 5 resembles FIG. 1, but shows the special case of the embodiment of FIG. 3 and FIG. 4 wherein the header compression key is a header of a protocol data unit for the Packet Data Convergence Protocol (PDCP), and wherein the packet flows are Internet Protocol (IP) packet flows. In this example embodiment, distinguishing between different flows of compressed packets is facilitated by a context identifier for a compression/decompression algorithm which is inserted in the PID field (e.g., field 23A) of header compression key 23. Preferably the context identifier (CID) is for a compression/decompression algorithm such as the Robust Header Compression (ROHC) algorithm which does not require packet type identification at a link layer level.

Figure 6:
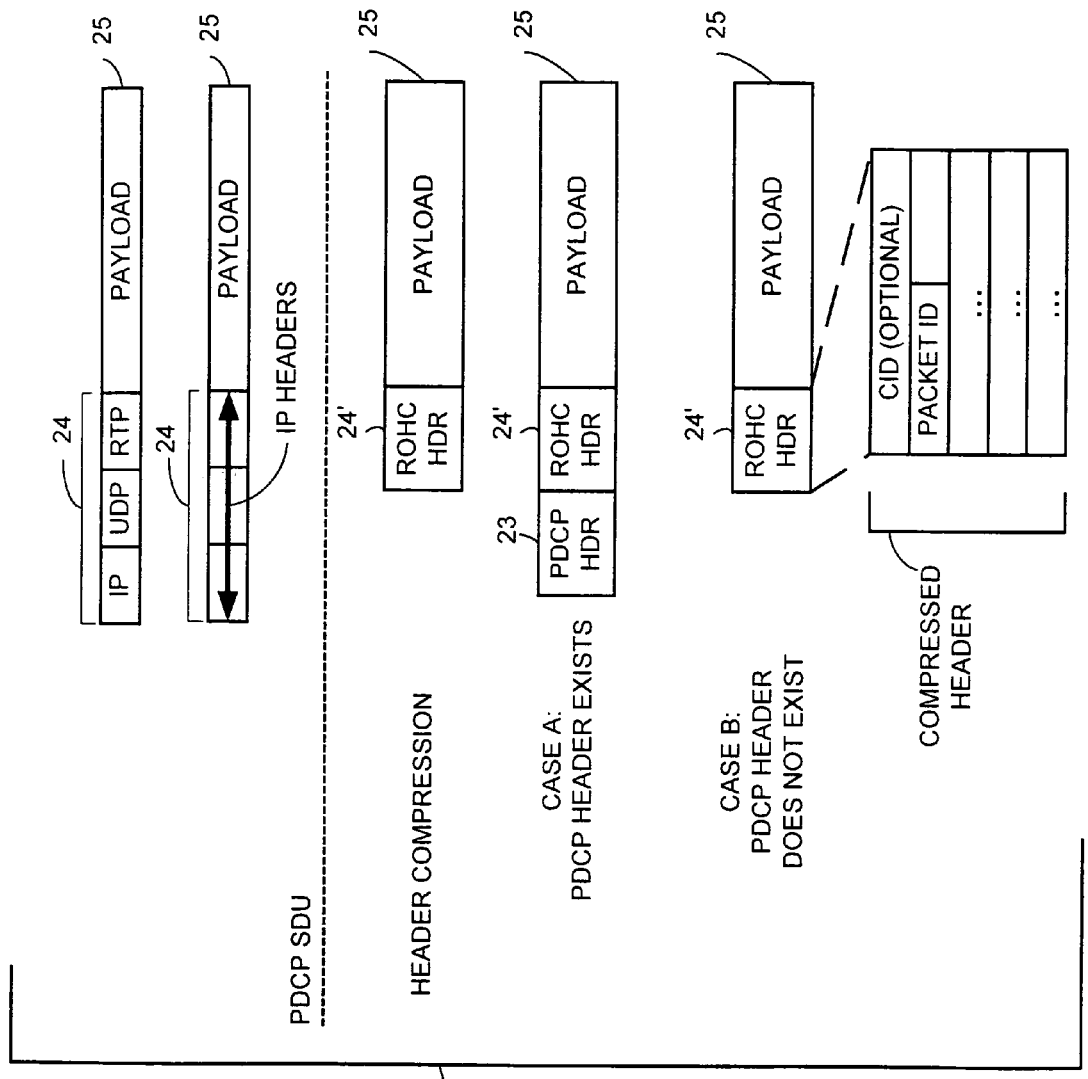
FIG. 6 is a diagrammatic view showing example formats of a PDCP SDU and PDCP PDU in accordance with the embodiment of FIGS. 3–5.

From FIG. 5 and FIG. 6 it can be seen that a packet known as a PDCP service data unit (PDCP SDU) is received at a PDCP entity (such as PDCP entity $20_1$) from the user plane. The PDCP SDU typically contains a header 24 and payload 25. The PDCP SDU header 24, in this embodiment, includes an IP header, a UDP header, and a RTP header, all of which are collectively referred to as the IP header. Another alternative is that the PDCP SDU header 24 includes an IP header and a TCP header. In using the ROHC compression algorithm, the compression entity $29_1$ compresses the header 24 to form a compressed header 24', also denominated as the ROHC header in FIG. 6. The payload or data 25 taken together with the compressed header 24' forms the PDCP PDU data. In one example embodiment herein discussed, the compressed header 24' is and ROHC header, but could instead be a compressed header from any header compression algorithm.

The PDCP entity $20_1$ generates a PDCP protocol data unit (PDCP PDU). In one case of operation (Case A shown in FIG. 6), the PDCP PDU has a header, known as the PDCP PDU header. But in another case of operation (Case B shown in FIG. 6), the PDCP PDU need not have a header (See, e.g., Third Generation Partnership Project (3GPP) Specification 3G TS 25.323 V3.3.0 (2000-09), Section 8.2.1). In the case in which a PDCP header is included, the PDCP DPU header formatter/deformatter 100 generates the PDCP header to include the header compression key 23, as described above.

The embodiment of FIG. 3 and FIG. 4, which is also explained by FIG. 5 and FIG. 6, can (in essentially the same manner as the embodiment of FIG. 1) operate in either the first mode of second mode of the invention. In the first mode PID field 23A of the PDCP PDU header is utilized exclusively for distinguishing between different flows of compressed packets, and therefore any number in the PID field 23A is taken to be a context identifier (CID). In the second mode of the invention, when the value in the PID field 23A is in a first subset or range of values, the contents of the PID field 23A is taken to be a particular compression identifier. On the other hand, in the second mode, when the value in the PID field 23A is in a second subset or range of values, the contents of the PID field 23A is taken to be a particular context identifier (CID) for distinguishing between different packet flows.

As in the embodiment of FIG. 1, the contents of the field 23B, e.g., the PDU type field, indicates whether a PDCP PDU is subject to the first mode or the second mode. Bit patterns in the PDU type field are explained by Table 2.

TABLE 2

| BIT | PDU Type |
|---|---|
| 000 | PID field used for header compression information (mode 2) |
| 001 | PID field used for header compression information and the PDCP PDU sequence number included (See, Third Generation Partnership Project (3GPP) Specification 3G TS 25.323 V3.3.0 (2000–09), Section 8.2.3) |
| 010 | PID field used only for context identifiers (CIDs) for ROHC only (mode 1) |

TABLE 2-continued

| BIT | PDU Type |
|---|---|
| 011 | PID field used only for context identifiers (CIDs) for Method C only. |
| 100–111 | Reserved |

Table 3 illustrates how CID values are assigned to the PID field 23A in the first mode of the invention, assuming that the PID field 23A has five bits. In Table 3, the RFCxxxx can refer to any RFC-related compression scheme, such as RFC2507, for example.

TABLE 3

| PID VALUE | Optimization Method | Packet Type |
|---|---|---|
| 0 | RFCxxxx | CID0 |
| 1 | RFCxxxx | CID1 |
| 2 | RFCxxxx | CID2 |
| 3 | RFCxxxx | CID3 |
| ... | ... | ... |
| 31 | RFCxxxx | CID31 |

For the same PID field 23A bit size assumption (five bits), Table 4 illustrates how CID values are assigned to the PID field 23A in accordance with the second mode of the invention, when the same PDCP PDU type is used for both ROHC and RFC2507 compression. In the particular situation shown in Table 4, the first ten PID values are assigned in similar manner as with Table 1.

TABLE 4

| PID VALUE | Optimization Method | Packet Type |
|---|---|---|
| 0 | No header compression | — |
| 1 | RFC2507 | Full header |
| 2 | RFC2507 | Compressed TCP |
| 3 | RFC2507 | Compressed TCP nondelta |
| 4 | RFC2507 | Compressed non TCP |
| 5 | RFC2507 | Context State |
| 6 | Method A | Uncompressed TCP/IP |
| 7 | Method A | Compressed TCP/IP |
| 8 | Method B | Uncompressed IP/UDP/RTP |
| 9 | Method B | Compressed IP/UDP/RTP |
| 10 | RFCxxxx | CID0 |
| 11 | RFCxxxx | CID1 |
| 12 | RFCxxxx | CID2 |
| 13 | Method C | CID3 |
| ... | ... | ... |
| 31 | Method D | CID21 |

As shown in FIG. 6, the ROHC compressed header 24' is able to identify its own packet type, so that the PDCP header 23 is not explicitly required. However, the ROHC compressed header 24' needs the CID field to identify the context flows. The CID field can be eight bits or sixteen bits long in the ROHC compressed header 24'. When the context id (CID) is expressible within the format of the PID field 23A of the header compression key 23 (e.g., the PDCP PDU header), the CID identification can instead be done in the PDCP PDU header, in which case the CID field of the ROHC compressed header 24' can be eliminated to realize savings.

From the foregoing and from Table 4 it will be appreciated that the number of ROHC packet types or context identifiers (CIDs) depends on the size of field 23A (e.g., the PID field) and the size of the subset of values already taken up by the compression identifiers (used, e.g., for RFC2507 compression). It is believed that a typical number of compression identifiers for RFC2507 packet types would be about six, thereby allowing the field 23A to also accommodate twenty six packet flows (CIDs). In a preferred embodiment, when a packet flow has its CID contained in the header compression key 23 (e.g., PID field of the PDCP PDU header), the CID does not have to be included in the ROHC compressed header 24' (e.g., the ROHC can be run in its "0-byte-CID-mode").

In the event that the field 23A does not have enough values available in its second subset to accommodate the number of packet flows, it should also be kept in mind that ROHC can also be used in the backbone, in which case one or two byte CID fields can be utilized to support the larger number of flows that might exist. In other words, the additional CID values can be included in the ROHC packet (e.g., the compressed packet 24' of FIG. 6, for example).

Figure 7:
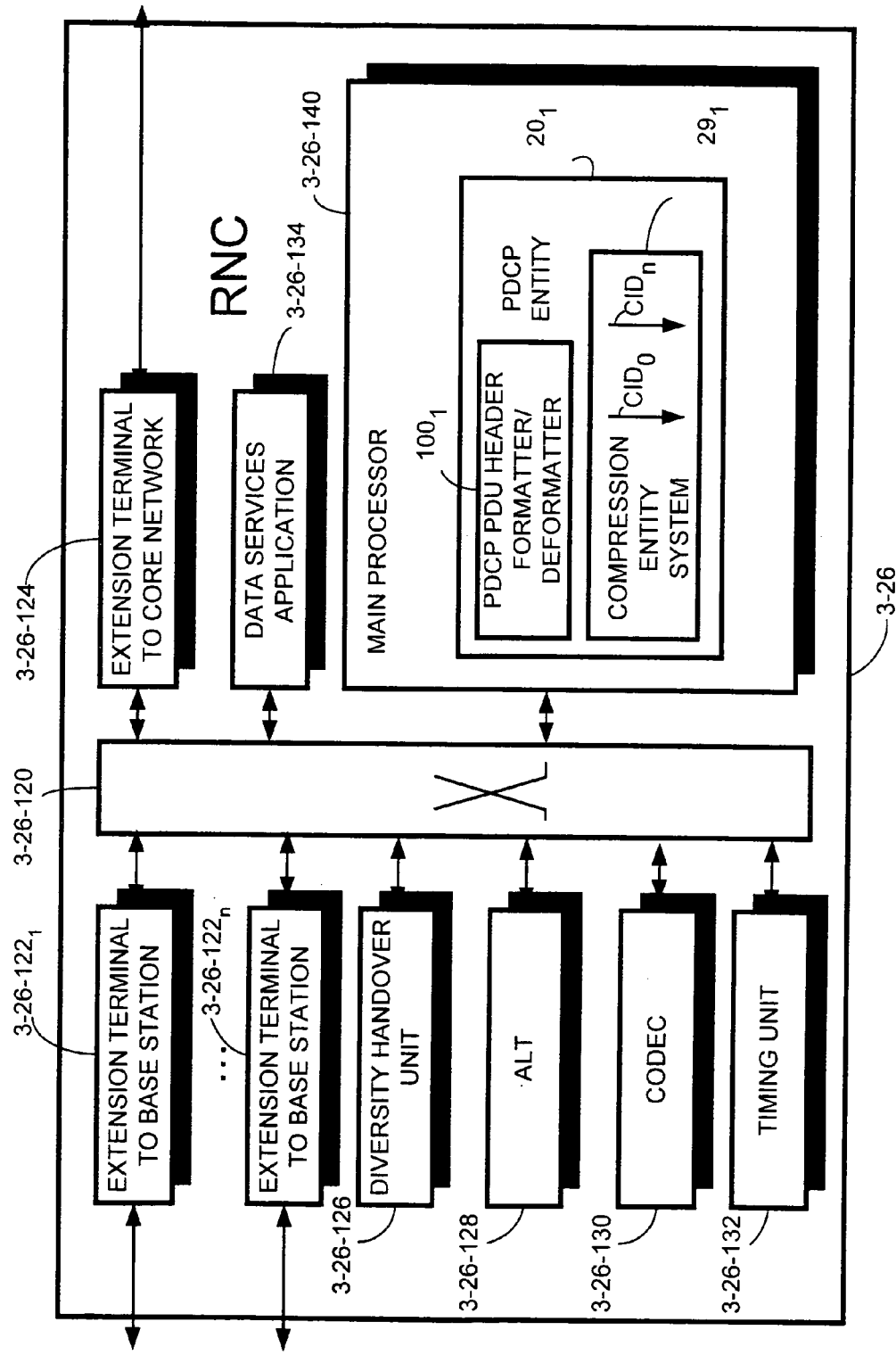
FIG. 7 is a schematic view of an example RNC node in accordance with one embodiment of the invention.

FIG. 7 illustrates, in somewhat more detail, an example non-limiting RNC node 3-26 which can be used of the present invention. It so happens that the RNC node 3-26 of FIG. 7 is a switched-based node having a switch 3-26-120. The switch 3-26-120 serves to interconnect other constituent elements of RNC node 3-26. Such other constituent elements include extension terminals $3\text{-}26\text{-}122_1$ through $3\text{-}26\text{-}122_n$, as well as extension terminal 3-26-124. Extension terminals $3\text{-}26\text{-}122_1$ through $3\text{-}26\text{-}122_n$ essentially function to connect RNC node 3-26 to the base stations 3-28 served RNC node 3-26; extension terminal 3-26-124 connects RNC node 3-26 across the Iu interface to the core network. Although unillustrated, likely there are one or more other extension terminals to connect RNC node 3-26 across another interface, known as the Iur interface, to other RNCs.

Yet other constituent elements of RNC node 3-26 include diversity handover unit 3-26-126; an ALT unit 3-26-128; codex 3-26-130; timing unit 3-26-132; a data services application unit 3-26-134; and, a main processor 3-26-140. The person skilled in the art will appreciate generally the functions of these constituent elements, it being noted that the ALT unit 3-26-128 is a unit which provides, e.g., multiplexing and demultiplexing and (optionally) queuing with regard to differing protocols of cells. In the example RNC node 3-26 of FIG. 7, it is the main processor 3-26-140 which hosts the PDCP entity 20, and thus the PDCP DPU header formatter/deformatter 100.

Figure 8:
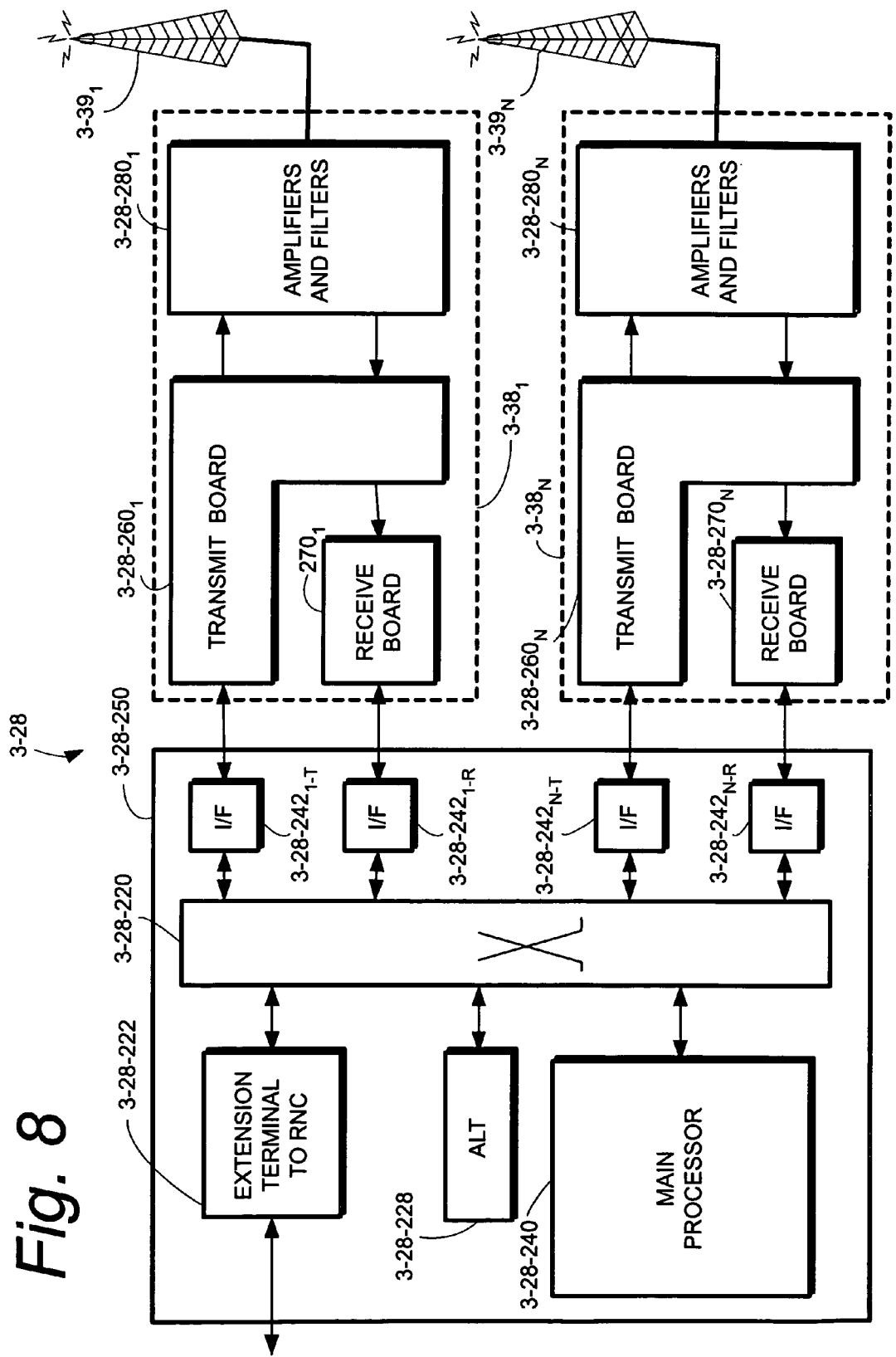
FIG. 8 is a schematic view of an example base station node in accordance with one embodiment of the invention.

FIG. 8 illustrates, in non-limiting manner, more details of an example base station (BS) node 3-28 in accordance with one embodiment of the present invention. As with RNC node 3-26, the base station (BS) node 3-28 of FIG. 8 is a switched-based node having a switch 3-28-220 which serves to interconnect other constituent elements of base station (BS) node 3-28. Such other constituent elements include extension terminal 3-28-222; ALT unit 3-28-228; BS main processor 3-28-240, and interface boards 3-28-42.

Extension terminal 3-28-22 connects base station (BS) node 3-28 to radio network controller (RNC) node 3-26, and thus comprises the Iub interface. As in the case of radio network controller (RNC) node 3-26, the ALT unit 3-28-228 is a unit which provides, e.g., multiplexing and demultiplexing and (optionally) queuing with regard to differing protocols of cells.

The embodiment of base station (BS) node 3-28 illustrated in FIG. 8 is housed in a rack having multiple subracks. Each subrack has one or more boards, e.g., circuit boards, mounted thereon. A first subrack 3-28-250 contains boards for each of extension terminal 3-28-222; ALT unit 3-28-228; BS main processor 3-28-240, and interface boards 3-28-242.

Each of the interface boards 3-28-242 is connected to a board on another subrack, e.g., one of the transmitter boards 3-28-260 or one of the receiver boards 3-28-270. Each receiver board 3-28-270 is connected to share certain transmitter/receiver resources in a corresponding transmitter board 3-28-260, with the transmitter board 3-28-260 being connected to a corresponding one of amplifiers and filters board 3-28-80. The amplifiers and filters board 3-28-280 is connected to an appropriate antenna 3-39. For example, interface board $3\text{-}28\text{-}242_{1\text{-}T}$ is connected to transmitter board $3\text{-}28\text{-}60_1$, while interface board $3\text{-}28\text{-}242_{1\text{-}R}$ is connected to receiver board $3\text{-}28\text{-}270_1$. The pair of transmitter board $3\text{-}28\text{-}260_1$ and receiver board $3\text{-}28\text{-}270_1$ is, in turn, connected to amplifiers and filters board $3\text{-}28\text{-}280_1$. Similar connections exist for a second pairing of transmitter board $3\text{-}28\text{-}260_2$ and receiver board $3\text{-}28\text{-}270_2$, which interface via interface board $3\text{-}28\text{-}242_{2\text{-}T}$ and interface board $3\text{-}28\text{-}242_{2\text{-}R}$, respectively. Each transceiver 3-38 of FIG. 4 thus comprises a subrack which includes a transmitter board 3-28-260, a receiver board 3-28-270, and amplifiers and filters board 3-28-280.

In one example embodiment, base station (BS) node 3-28 is an ATM-based node, with interface boards 3-28-242 performing various ATM interfacing functions. The transmitter boards 3-28-260 and receiver boards 3-28-270 each include several devices. For example, each transmitter board 3-28-260 includes unillustrated elements such as an interface connected to its corresponding interface board 3-28-242; an encoder; a modulator; and, a baseband transmitter. In addition, the transmitter board 3-28-260 includes the transmitter/receiver sources which it shares with receiver board 3-28-270, including a radio frequency transmitter. Each receiver board 3-28-270 includes unillustrated elements such as an interface connected to its corresponding interface board 3-28-242; a decoder; a demodulator; and, a baseband receiver. Each amplifiers and filters board 3-28-280 includes amplifiers, such as MCPA and LNA amplifiers.

The present invention advantageously permits a compression level-header (e.g., ROHC header) carried in a data portion (e.g., non-header portion) of the protocol data unit to omit its context identifier, since the context identifier is instead carried in the header of the link layer protocol data unit. Thus, the present invention can reduce overhead involved with header transmission. Further, the present invention advantageously facilitates mixing of compression/decompression techniques regardless of whether the techniques require packet type identification at the link level, e.g., a mixing of the Robust Header Compression (ROHC) algorithm and IP header compression algorithms such as RFC2507. Such mixing enables support of combinations of complex applications, such as a mix of RTP/UDP/IP traffic (which utilizes ROHC) and TCP/IP traffic (which utilizes RFC2507 compression).

Figure 1A:
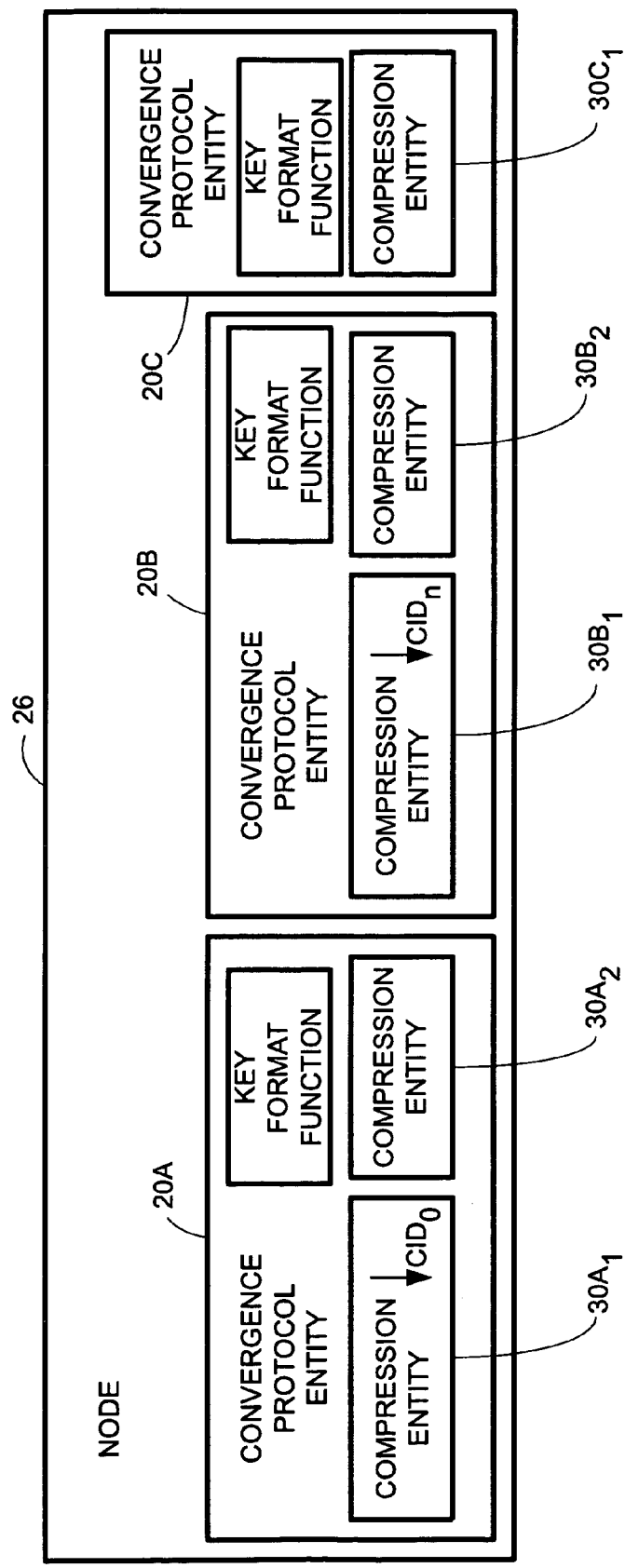
FIG. 1A is a diagrammatic function block view showing that a node of a telecommunications network such as that of FIG. 1 can have plural convergence protocol entities in accordance with an embodiment of the present invention.

For sake of simplicity, the nodes 26 in the embodiment of FIG. 1 have been described as each having only one convergence protocol entity 20. Similarly, and also of convenience, the RNC 3-26 and user equipment unit (UE) 3-30 in the embodiment of FIG. 3 and FIG. 4, have been described as each having only one PDCP entity 20. However, it should be understood that each node (e.g., RNC or UE) may actually comprise plural entities 20, such as in the example manner illustrated in FIG. 1A. For example, the representative node 26 of FIG. 1A has three convergence protocol entities 20A through 20C, with each convergence protocol entity having one or more compression entities (e.g., compression/decompression engines which each perform differing compression/decompression algorithms). For example, convergence protocol entity 20A has compression entities 30A₁ and 30A₂; convergence protocol entity 20B has compression entities 30B₁ and 30B₂; and convergence protocol entity 20A has compression entities 30A₁ and 30A₂; convergence protocol entity 20C has compression entity 30C₁. One or more of the convergence protocol entities 20A through 20C may have the same or similar compression entities. For example, compression entity 30C₁ may perform the same compression algorithm as does compression entity 30A₁.

It should be understood, particularly with reference to the generic embodiment of FIG. 1, that the invention is not confined to utilization with the ROHC and RFCxxxx (e.g., RFC2507) compression algorithms, but that other compression algorithms are entirely within the scope of the present invention. When running with ROHC, at least one byte of overhead per ROHC packet is saved when using ROHC together with RFC2507, e.g., when having TCP/IP (best effort) flows and RTP/UDP/IP (real time) in the same PDCP header.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A telecommunications network having a first entity which communicates with a second entity by sending a packet having a compressed header, characterized in that the first entity also sends to the second entity a header compression key associated with the packet, the header compression key having a first field which is utilized for distinguishing between different flows of compressed packets, wherein a first subset of values for the first field of the header compression key is employed to distinguish between different header compression identifiers and wherein a second subset of values for the first field is employed to distinguish between the different flows of compressed packets.

2. The apparatus of claim 1, wherein the values of the second subset succeed the values of the first subset.

3. The apparatus of claim 1, wherein the header compression identifiers denote a header compression method and a packet type.

4. The apparatus of claim 1, wherein the header compression key is included in a header of a protocol data unit of a link layer protocol.

5. The apparatus of claim 4, wherein the header compression key is a header of a protocol data unit for Packet Data Convergence Protocol (PDCP), and wherein the first field is a PID type field.

6. The apparatus of claim 1, wherein the second set of values comprise context identifiers for a compression/decompression algorithm.

7. The apparatus of claim 1, wherein the second set of values comprise context identifiers for a compression/decompression algorithm which does not require packet type identification at a link layer level.

8. The apparatus of claim 7, wherein the compression/decompression algorithm is the Robust Header Compression (ROHC) algorithm.

9. A telecommunications network having a first entity which communicates with a second entity by sending a packet having a compressed header, characterized in that the first entity also sends to the second entity a header compression key associated with the packet, the header compression key having a first field which is utilized for distinguishing between different flows of compressed packets, wherein the header compression key has a second field which is utilized to indicate whether the first field of the header compression key is utilized exclusively for distinguishing between the different flows of compressed packets.

10. The apparatus of claim 9, wherein a first value in the second field of the header compression key indicates that the first field of the header compression key is utilized exclusively for distinguishing between the different flows of compressed packets, and wherein a second value in the second field of the header compression key indicates that data in the first field of the header compression key, depending on its value, can be either a header compression identifier or a packet flow identifier.

11. The apparatus of claim 10, wherein the data in the first field of the header compression key, when included in a first subset of values, distinguishes between different header compression identifiers, and wherein the data in the first field of the header compression key, when included in a second subset of values, distinguishes between the different flows of compressed packets.

12. The apparatus of claim 11, wherein the values of the second subset succeed to the values of the first subset.

13. The apparatus of claim 11, wherein the header compression identifiers denote a header compression method and a packet type.

14. The apparatus of claim 11, wherein the header compression key is included in a header of a protocol data unit of a link layer protocol.

15. The apparatus of claim 14, wherein the header compression key is included in a header of a protocol data unit for Packet Data Convergence Protocol (PDCP), and wherein the first field is a PID type field.

16. The apparatus of claim 11, wherein the second subset of values comprise context identifiers for a compression/decompression algorithm.

17. The apparatus of claim 16, wherein the second subset of values comprise context identifiers for a compression/decompression algorithm which does not require packet type identification at a link layer level.

18. The apparatus of claim 17, wherein the compression/decompression algorithm is the Robust Header Compression (ROHC) algorithm.

19. The apparatus of claim 9, wherein the header compression key is included in a header of a protocol data unit of a link layer protocol.

20. The apparatus of claim 19, wherein the header compression key is included in a header of a protocol data unit for Packet Data Convergence Protocol (PDCP), and wherein the second field is a PDU type field.

21. The apparatus of claim 9, wherein the header compression key is included in a protocol data unit of a link layer protocol.

22. A node of a cellular telecommunications network which has a first entity which communicates with a second entity by sending a packet having a compressed header, characterized in that the first entity also sends to the second entity a header compression key associated with the packet, the header compression key having a first field which is utilized for distinguishing between different flows of compressed packets, wherein a first subset of values for the first field of the header compression key is employed to distinguish between different header compression identifiers and wherein a second subset of values for the first field is employed to distinguish between the different flows of compressed packets.

23. The apparatus of claim 22, wherein the values of the second subset succeed the values of the first subset.

24. The apparatus of claim 22, wherein the header compression identifiers denote a header compression method and a packet type.

25. The apparatus of claim 22, wherein the header compression key is included in a header of a protocol data unit of a link layer protocol.

26. The apparatus of claim 25, wherein the header compression key is a header of a protocol data unit for Packet Data Convergence Protocol (PDCP), and wherein the first field is a PID type field.

27. The apparatus of claim 22, wherein the second set of values comprise context identifiers for a compression/decompression algorithm.

28. The apparatus of claim 22, wherein the second set of values comprise context identifiers for a compression/decompression algorithm which does not require packet type identification at a link layer level.

29. The apparatus of claim 28, wherein the compression/decompression algorithm is the Robust Header Compression (ROHC) algorithm.

30. A node of a cellular telecommunications network which has a first entity which communicates with a second entity by sending a packet having a compressed header, characterized in that the first entity also sends to the second entity a header compression key associated with the packet, the header compression key having a first field which is utilized for distinguishing between different flows of compressed packets, wherein the header compression key has a second field which is utilized to indicate whether the first field of the header compression key is utilized exclusively for distinguishing between the different flows of compressed packets.

31. The apparatus of claim 30, wherein a first value in the second field of the header compression key indicates that the first field of the head compression key is utilized exclusively for distinguishing between the different flows of compressed packets, and wherein a second value in the second field of the header compression key indicates that data in the first field of the header compression key, depending on its value, can be either a header compression identifier or a packet flow identifier.

32. The apparatus of claim 31, wherein the data in the first field of the header compression key, when included in a first subset of values, distinguishes between different header compression identifiers, and wherein the data in the first field of the header compression key, when included in a second subset of values, distinguishes between the different flows of compressed packets.

33. The apparatus of claim 32, wherein the values of the second subset succeed the values of the first subset.

34. The apparatus of claim 32, wherein the header compression identifiers denote a header compression method and a packet type.

35. The apparatus of claim 32, wherein the header compression key is included in a header of a protocol data unit of a link layer protocol.

36. The apparatus of claim 35, wherein the header compression key is included in a header of a protocol data unit for Packet Data Convergence Protocol (PDCP), and wherein the first field is a PID type field.

37. The apparatus of claim 32, wherein the second subset of values comprise context identifiers for a compression/decompression algorithm.

38. The apparatus of claim 37, wherein the second subset of values comprise context identifiers for a compression/decompression algorithm which does not require packet type identification at a link layer level.

39. The apparatus of claim 38, wherein the compression/decompression algorithm is the Robust Header Compression (ROHC) algorithm.

40. The apparatus of claim 30, wherein the header compression key is included in a header of a protocol data unit of a link layer protocol.

41. The apparatus of claim 40, wherein the header compression key is included in a header of a protocol data unit for Packet Data Convergence Protocol (PDCP), and wherein the second field is a PDU type field.

42. The apparatus of claim 30, wherein the header compression key is included in a protocol data unit of a link layer protocol.

43. A user equipment unit (UE) having a first entity which communicates with a second entity by sending a packet having a compressed header, the second entity being situated at a node of a cellular telecommunications network, characterized in that the first entity also sends to the second entity a header compression key associated with the packet, the header compression key having a first field which is utilized for distinguishing between different flows of compressed packets, wherein a first subset of values for the first field of the header compression key is employed to distinguish between different header compression identifiers and wherein a second subset of values for the first field is employed to distinguish between the different flows of compressed packets.

44. The apparatus of claim 43, wherein the values of the second subset succeed the values of the first subset.

45. The apparatus of claim 43, wherein the header compression identifiers denote a header compression method and a packet type.

46. The apparatus of claim 43, wherein the header compression key is included in a header of a protocol data unit of a link layer protocol.

47. The apparatus of claim 46, wherein the header compression key is a header of a protocol data unit for Packet Data Convergence Protocol (PDCP), and wherein the first field is a PID type field.

48. The apparatus of claim 43, wherein the second set of values comprise context identifiers for a compression/decompression algorithm.

49. The apparatus of claim 43, wherein the second set of values comprise context identifiers for a compression/decompression algorithm which does not require packet type identification at a link layer level.

50. The apparatus of claim 49, wherein the compression/decompression algorithm is the Robust Header Compression (ROHC) algorithm.

51. A user equipment unit (UE) having a first entity which communicates with a second entity by sending a packet having a compressed header, the second entity being situated at anode of a cellular telecommunications network, characterized in that the first entity also sends to the second entity a header compression key associated with the packet, the header compression key having a first field which is utilized for distinguishing between different flows of compressed packets, wherein the header compression key has a second field which is utilized to indicate whether the first field of the header compression key is utilized exclusively for distinguishing between the different flows of compressed packets.

52. The apparatus of claim 51, wherein a first value in the second field of the header compression key indicates that the first field of the header compression key is utilized exclusively for distinguishing between the different flows of compressed packets, and wherein a second value in the second field of the header compression key indicates that data in the first field of the header compression key, depending on its value, can be either a header compression identifier or a packet flow identifier.

53. The apparatus of claim 52, wherein the data in the first field of the header compression key, when included in a first subset of values, distinguishes between different header compression identifiers, and wherein the data in the first field of the header compression key, when included in a second subset of values, distinguishes between the different flows of compressed packets.

54. The apparatus of claim 53, wherein the values of the second subset succeed the values of the first subset.

55. The apparatus of claim 53, wherein the header compression identifiers denote a header compression method and a packet type.

56. The apparatus of claim 53, wherein the header compression key is included in a header of a protocol data unit of a link layer protocol.

57. The apparatus of claim 56, wherein the header compression key is included in a header of a protocol data unit for Packet Data Convergence Protocol (PDCP), and wherein the first field is a PID type field.

58. The apparatus of claim 53, wherein the second subset of values comprise context identifiers for a compression/decompression algorithm.

59. The apparatus of claim 58, wherein the second subset of values comprise context identifiers for a compression/decompression algorithm which does not require packet type identification at a link layer level.

60. The apparatus of claim 59, wherein the compression/decompression algorithm is the Robust Header Compression (ROHC) algorithm.

61. The apparatus of claim 51, wherein the header compression key is included in a header of a protocol data unit of a link layer protocol.

62. The apparatus of claim 61, wherein the header compression key is included in a header of a protocol data unit for Packet Data Convergence Protocol (PDCP), and wherein the second field is a PDU type field.

63. The apparatus of claim 51, wherein the header compression key is included in a protocol data unit of a link layer protocol.

64. A method of operating a telecommunications network having a first entity which communicates with a second entity by sending a packet having a compressed header, the method characterized by sending from the first entity sends to the second entity a header compression key associated with the packet, the header compression key having a first field which is utilized for distinguishing between different flows of compressed packets, wherein a first subset of values for the first field of the header compression key is employed to distinguish between different header compression identifiers and wherein a second subset of values for the first field is employed to distinguish between the different flows of compressed packets.

65. The method of claim 64, wherein the values of the second subset succeed the values of the first subset.

66. The method of claim 64, wherein the header compression identifiers denote a header compression method and a packet type.

67. The method of claim 64, wherein the header compression key is included in a header of a protocol data unit of a link layer protocol.

68. The method of claim 67, wherein the header compression key is a header of a protocol data unit for Packet Data Convergence Protocol (PDCP), and wherein the first field is a PID type field.

69. The method of claim 64, wherein the second set of values comprise context identifiers for a compression/decompression algorithm.

70. The method of claim 64, wherein the second set of values comprise context identifiers for a compression/decompression algorithm which does not require packet type identification at a link layer level.

71. The method of claim 70, wherein the compression/decompression algorithm is the Robust Header Compression (ROHC) algorithm.

72. A method of operating a telecommunications network having a first entity which communicates with a second entity by sending a packet having a compressed header, the method characterized by sending from the first entity sends to the second entity a header compression key associated with the packet, the header compression key having a first field which is utilized for distinguishing between different flows of compressed packets, wherein the header compression key has a second field which is utilized to indicate whether the first field of the header compression key is utilized exclusively for distinguishing between the different flows of compressed packets.

73. The method of claim 72, wherein a first value in the second field of the header compression key indicates that the first field of the header compression key is utilized exclusively for distinguishing between the different flows of compressed packets, and wherein a second value in the second field of the header compression key indicates that data in the first field of the header compression key, depending on its value, can be either a header compression identifier or a packet flow identifier.

74. The method of claim 73, wherein the data in the first field of the header compression key, when included in a first subset of values, distinguishes between different header compression identifiers, and wherein the data in the first field of the header compression key, when included in a second subset of values, distinguishes between the different flows of compressed packets.

75. The method of claim 74, wherein the values of the second subset succeed the values of the first subset.

76. The method of claim 74, wherein the header compression identifiers denote a header compression method and a packet type.

77. The method of claim 74, wherein the header compression key is included in a header of a protocol data unit of a link layer protocol.

78. The method of claim 77, wherein the header compression key is included in a header of a protocol data unit for Packet Data Convergence Protocol (PDCP), and wherein the first field is a PID type field.

79. The method of claim 74, wherein the second subset of values comprise context identifiers for a compression/decompression algorithm.

80. The method of claim 79, wherein the second subset of values comprise context identifiers for a compression/decompression algorithm which does not require packet type identification at a link layer level.

81. The method of claim 80, wherein the compression/decompression algorithm is the Robust Header Compression (ROHC) algorithm.

82. The method of claim 72, wherein the header compression key is included in a header of a protocol data unit of a link layer protocol.

83. The method of claim 82, wherein the header compression key is included in a header of a protocol data unit for Packet Data Convergence Protocol (PDCP), and wherein the second field is a PDU type field.

84. The method of claim 72, wherein the header compression key is included in a protocol data unit of a link layer protocol.

85. A telecommunications network having a first entity which communicates with a second entity by sending a packet having a compressed header, characterized in that the first entity also sends to the second entity a header compression key associated with the packet, the header compression key having a first field indicating a used header compression and packet type or context identifier, wherein a first subset of values for the first field of the header compression key is employed to distinguish between different header compression protocol packet types and wherein a second subset of values for the first field is employed to distinguish between the different contexts for a header compressed protocol.

86. The apparatus of claim 85, wherein the values of the second subset succeed the values of the first subset.

87. The apparatus of claim 85, wherein the header compression key is included in a header of a protocol data unit of a link layer protocol.

88. The apparatus of claim 87, wherein the header compression key is a header of a protocol data unit for Packet Data Convergence Protocol (PDCP), and wherein the first field is a PID type field.

89. The apparatus of claim 85, wherein the second set of values comprise context identifiers for a compression/decompression algorithm which does not require packet type identification at a link layer level.

90. The apparatus of claim 89, wherein the compression/decompression algorithm is the Robust Header Compression (ROHC) algorithm.

91. A node of a cellular telecommunications network which has a first entity which communicates with a second entity by sending a packet having a compressed header, characterized in that the first entity also sends to the second entity a header compression key associated with the packet, the header compression key having a first field indicating a used header compression and packet type or context identifier, wherein a first subset of values for the first field of the header compression key is employed to distinguish between different header compression protocol packet types and wherein a second subset of values for the first field is employed to distinguish between the different contexts for a header compressed protocol.

92. The apparatus of claim 91, wherein the values of the second subset succeed the values of the first subset.

93. The apparatus of claim 91, wherein the header compression key is included in a header of a protocol data unit of a link layer protocol.

94. The apparatus of claim 93, wherein the header compression key is a header of a protocol data unit for Packet Data Convergence Protocol (PDCP), and wherein the first field is a PID type field.

95. The apparatus of claim 91, wherein the second set of values comprise context identifiers for a compression/decompression algorithm which does not require packet type identification at a link layer level.

96. The apparatus of claim 95, wherein the compression/decompression algorithm is the Robust Header Compression (ROHC) algorithm.

97. A user equipment unit (UE) having a first entity which communicates with a second entity by sending a packet having a compressed header, the second entity being situated at a node of a cellular telecommunications network, characterized in that the first entity also sends to the second entity a header compression key associated with the packet, the header compression key having a first field indicating a used header compression and packet type or context identifier, wherein a first subset of values for the first field of the header compression key is employed to distinguish between different header compression protocol packet types and wherein a second subset of values for the first field is employed to distinguish between the different contexts for a header compressed protocol.

98. The apparatus of claim 97, wherein the values of the second subset succeed the values of the first subset.

99. The apparatus of claim 97, wherein the header compression key is included in a header of a protocol data unit of a link layer protocol.

100. The apparatus of claim 99, wherein the header compression key is a header of a protocol data unit for Packet Data Convergence Protocol (PDCP), and wherein the first field is a PID type field.

101. The apparatus of claim 97, wherein the second set of values comprise context identifiers for a compression/decompression algorithm which does not require packet type identification at a link layer level.

102. The apparatus of claim 101, wherein the compression/decompression algorithm is the Robust Header Compression (ROHC) algorithm.

103. A method of operating a telecommunications network having a first entity which communicates with a second entity by sending a packet having a compressed header, the method characterized by sending from the first entity sends to the second entity a header compression key associated with the packet, the header compression key having a first field indicating a used header compression and packet type or context identifier, wherein a first subset of values for the first field of the header compression key is employed to distinguish between different header compression protocol packet types and wherein a second subset of values for the first field is employed to distinguish between the different contexts for a header compressed protocol.

104. The method of claim 103, wherein the values of the second subset succeed the values of the first subset.

105. The method of claim 103, wherein the header compression key is included in a header of a protocol data unit of a link layer protocol.

106. The method of claim 105, wherein the header compression key is a header of a protocol data unit for Packet Data Convergence Protocol (PDCP), and wherein the first field is a PID type field.

107. The method of claim 103, wherein the second set of values comprise context identifiers for a compression/decompression algorithm which does not require packet type identification at a link layer level.

108. The method of claim 107, wherein the compression/decompression algorithm is the Robust Header Compression (ROHC) algorithm.

* * * * *